(12) United States Patent
Lascaud et al.

(10) Patent No.: US 9,136,539 B2
(45) Date of Patent: Sep. 15, 2015

(54) IRON-AIR ACCUMULATOR WITH LITHIUM MEDIATOR

(75) Inventors: Stephane Lascaud, Fontainebleau (FR); Philippe Stevens, Noisy Rudignon (FR)

(73) Assignee: Electricite de France, Paris (FR)

( * ) Notice: Subject to any disclaimer, the term of this patent is extended or adjusted under 35 U.S.C. 154(b) by 1119 days.

(21) Appl. No.: 12/992,279

(22) PCT Filed: Nov. 11, 2009

(86) PCT No.: PCT/FR2009/050857
§ 371 (c)(1),
(2), (4) Date: Nov. 12, 2010

(87) PCT Pub. No.: WO2009/147339
PCT Pub. Date: Dec. 10, 2009

(65) Prior Publication Data
US 2011/0065009 A1    Mar. 17, 2011

(30) Foreign Application Priority Data

May 13, 2008  (FR) ..................... 08 53066

(51) Int. Cl.
*H01M 2/16* (2006.01)
*H01M 4/74* (2006.01)
(Continued)

(52) U.S. Cl.
CPC ............... *H01M 4/74* (2013.01); *H01M 2/162* (2013.01); *H01M 2/1606* (2013.01); *H01M 2/1646* (2013.01); *H01M 2/1686* (2013.01);
(Continued)

(58) Field of Classification Search
CPC ......... H01M 6/16; H01M 6/22; H01M 2/162; H01M 2/1606; H01M 2/1646; H01M 2/1686
See application file for complete search history.

(56) References Cited

U.S. PATENT DOCUMENTS 3,977,901 A * 8/1976 Buzzelli ................. 429/406
5,582,935 A   12/1996 Dasgupta et al.
(Continued)

FOREIGN PATENT DOCUMENTS

FR    2 870 639    11/2005
FR    2 901 641    11/2007
(Continued)

OTHER PUBLICATIONS

PCT International Search Report received in PCT/FR2009/050857.

*Primary Examiner* — Zachary Best
(74) *Attorney, Agent, or Firm* — Vedder Price P.C.; Thomas J. Kowalski; Rebecca G. Rudich

(57) ABSTRACT

The invention relates to a half-cell including an electrode formed of an electron collector containing one or more transition metals from groups 4 to 12 of the Period Table of the Elements, and of an electrochemically active material present on the surface of the electron collector in the form of a nanostructured conversion film containing nanoparticles having an average diameter of between 1 nm and 1000 nm. The electrochemically active material contains at least one compound of the transition metal or the transition metals present in the electron collector. The invention further includes a continuous film of a lithium-ion conductive, solid electrolyte that is water- and air-impermeable and that is deposited directly onto, covering totally, the surface of the nanostructured active material of the electrode. The continuous film of solid electrolyte having a thickness of between 1 μm and 50 μm.

19 Claims, 2 Drawing Sheets

Figure 1:
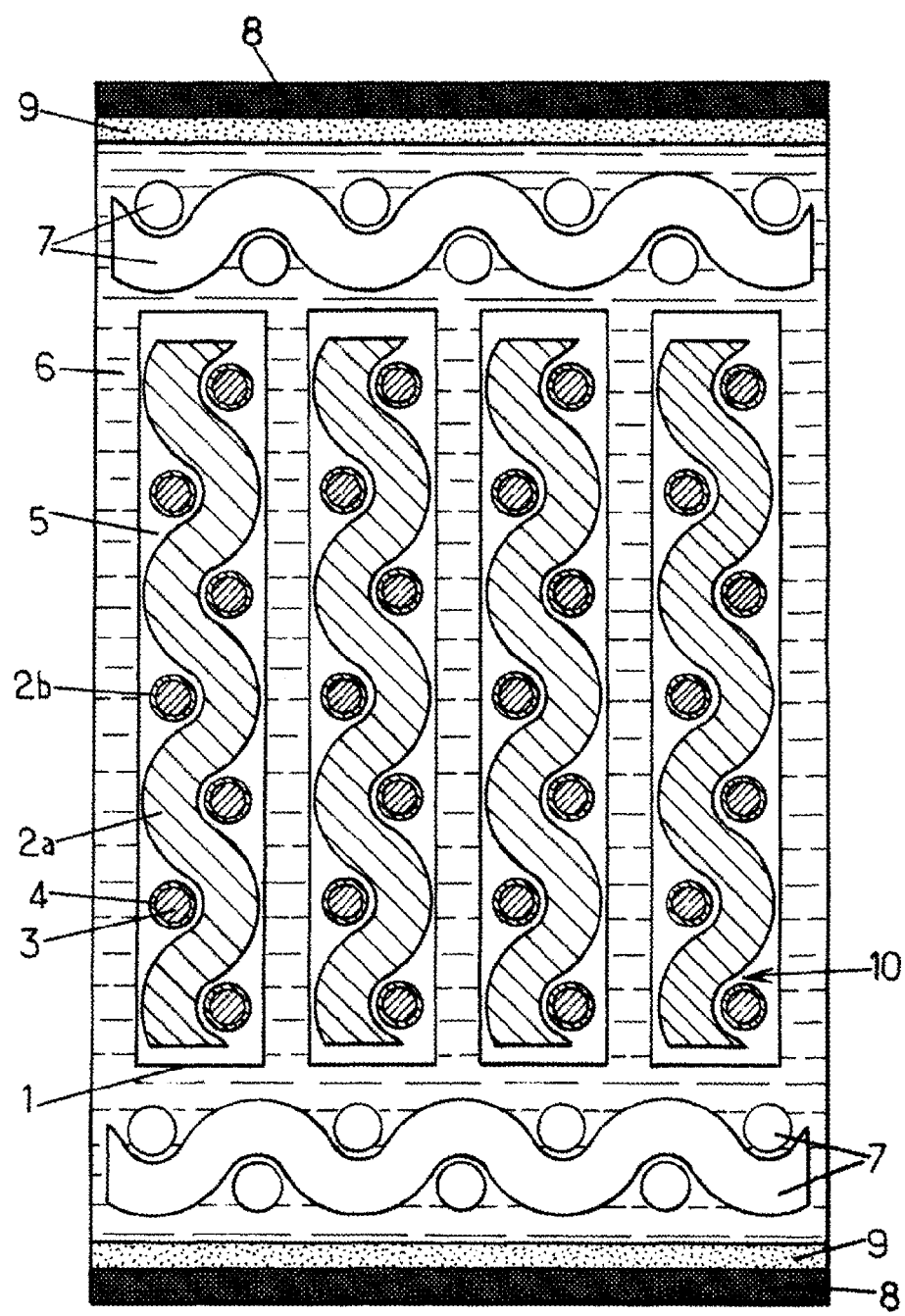

(51) Int. Cl.
  *H01M 4/04* (2006.01)
  *H01M 4/24* (2006.01)
  *H01M 4/52* (2010.01)
  *H01M 12/08* (2006.01)

(52) U.S. Cl.
  CPC ............ *H01M4/049* (2013.01); *H01M 4/0445* (2013.01); *H01M 4/24* (2013.01); *H01M 4/521* (2013.01); *H01M 12/08* (2013.01); *H01M 2300/0014* (2013.01); *Y02E 60/124* (2013.01)

(56) References Cited

U.S. PATENT DOCUMENTS

| | | |
|---|---|---|
| 2005/0100792 A1 | 5/2005 | Visco et al. |
| 2007/0015060 A1* | 1/2007 | Klaassen ................. 429/309 |
| 2007/0172739 A1* | 7/2007 | Visco et al. ............. 429/322 |
| 2007/0231688 A1 | 10/2007 | Grugeon et al. |
| 2007/0259234 A1 | 11/2007 | Chua et al. |
| 2008/0268327 A1* | 10/2008 | Gordon et al. .......... 429/50 |
| 2009/0214939 A1* | 8/2009 | Yamamoto et al. ..... 429/102 |
| 2010/0273049 A1* | 10/2010 | Vidal et al. .............. 429/207 |

FOREIGN PATENT DOCUMENTS

| | | | |
|---|---|---|---|
| WO | WO 00/36676 | 6/2000 | |
| WO | WO2007/023920 | * 3/2007 | ........... H01B 1/12 |
| WO | WO 2007/111895 | 10/2007 | |
| WO | WO 2007/135331 | 11/2007 | |
| WO | WO2007/135331 | * 11/2007 | ........... H01M 4/02 |

* cited by examiner

IRON-AIR ACCUMULATOR WITH LITHIUM MEDIATOR

This application claims the benefit of priority to PCT Patent Application No: PCT/FR2009/050857, filed May 11, 2009, which claims priority from French Patent Application No: 08/53,066, filed May 13, 2008, which is hereby incorporated by reference in its entirety.

The invention relates to a new type of electrochemical generator comprising a negative electrode made of a nanostructured active material and a lithium-ion conductive, solid electrolyte that covers the active material of the electrode, said generator also comprising an aqueous electrolyte (that contains lithium ions), an air electrode and an oxygen-emitting electrode.

The specific energy density (expressed in Wh/kg) of batteries remains the main factor limiting their use in portable equipment, such as portable electronics or electric vehicles. The limited energy of these batteries is in a large part associated with the performance of the materials from which they are made. Currently available negative electrode materials generally have a specific capacity of 300 Ah/kg to 350 Ah/kg. For positive electrode materials this value is only about 100 Ah/kg to 150 Ah/kg.

Using an air electrode as a positive electrode allows this upper limit to be exceeded and thus for the capacity per unit mass of the battery to be increased.

The French patent application FR 2870639 in the name of the Applicant describes an electrode for lithium-ion or lithium-metal batteries which is characterized by, on the surface of the electron collector, a film of nanostructured electrochemically active material containing nanoparticles formed by a compound, for example an oxide, of the metal or metals forming the electron collector. The particular structure of the electrochemically active material improves the performance in terms of power and energy density per unit mass.

Patent application FR 2901641, also in the name of the Applicant, relates to an electrode improvement described in FR 2870639. This improvement resides in the textile structure of said electrode and leads to a significant improvement in the energy density per unit mass of batteries containing it. Each of the wires of the textile structure, which is preferably a woven structure, is formed from a metal central part (electron collector) and a nanostructured surface conversion film (electrochemically active material).

When the Applicant tried to associate the nanostructured electrodes, described as negative electrodes in applications FR 2870639 and FR 2901641, with a positive air electrode it was confronted with a negative electrode instability problem. This was because the use of an air electrode presupposes the presence of an aqueous electrolyte. If the negative electrode makes contact with the water of the aqueous electrolyte, the water is reduced to hydrogen and the negative electrode is irreversibly corroded.

It therefore proved necessary to devise a means of effectively separating a negative electrode of the type of those described in applications FR 2870639 and FR 2901641 from an aqueous electrolyte containing lithium, indispensable for the operation of a positive air electrode.

This separation was made possible using a lithium-ion conductive, solid electrolyte deposited, in the form of a thin film, onto the surface of the nanostructured anode.

A subject of the present invention is consequently a half-cell comprising:
- (a) an electrode formed of an electron collector containing one or more transition metals from groups 4 to 12 of the Period Table of the Elements, and of an electrochemically active material present on the surface of the electron collector in the form of a nanostructured conversion film containing nanoparticles having an average diameter of between 1 nm and 1000 nm, said electrochemically active material containing at least one compound of the transition metal or the transition metals present in the electron collector; and
- (b) a continuous film of a lithium-ion conductive, solid electrolyte that is water- and air-impermeable and that is deposited directly onto, covering totally, the surface of the nanostructured active material of the electrode (a), said continuous film of solid electrolyte having a thickness of between 1 µm and 50 µm.

Another subject of the invention is an electrochemical generator containing at least one such half-cell as a negative electrode.

As explained in patent application FR 2870639, the nanostructured film containing nanoparticles of at least one compound of a transition metal, present in the electron collector, is a conversion film, that is to say a film obtained by chemical or electrochemical transformation of the surface of the metal material forming the current collector. Known advantages of such a conversion film are, in particular, good adherence of the surface film formed and the great ease with which such a film may be produced by simple treatment of the starting metal.

In a preferred embodiment of the present invention the electrode (a) has a textile structure formed from metal wires with a nanostructured surface conversion film, forming the active material of the electrode.

To the known advantages of conversion films is then added a particular advantage associated with the thin textile structure of the electrode. Specifically, during the formation of the electrochemically active material, the textile structure of the electrode is preserved, that is to say the openings or apertures in the fabric are not at risk of being blocked by the deposition of an active material. Such blocking would in fact reduce the inherent advantages of such a textile structure. This risk of blocking the openings in the textile is of course increased all the more because the openings are small. Preparing the active material by forming a conversion film limits the risk of blocking the openings in the textile because no metal or other material is supplied from outside and the microscopic dimensions (diameter and wire spacing) of the electrode (electron collector+active material) are thus substantially identical to those of the initial metal textile used.

The metal-wire textile used to form the electrode according to the invention may be a woven, nonwoven, or knitted textile. It is preferably a woven textile.

The metal textile used to form the electrode of the present invention is preferably formed from very thin wires, relatively closely spaced from one another. This is because the thinner the wires and the greater their number per unit area, the greater the BET (Brunauer-Emmett-Teller) specific surface area of the electrode.

Generally, the equivalent diameter of the cross section of the metal wires or fibers forming the initial textile, or the wires of the textile electrode which are covered with an active material conversion film, is between 3 µm and 1 mm, preferably between 7 µm and 100 µm and in particular between 10 µm and 50 µm. The expression "equivalent diameter" is understood to mean the diameter of a circle having the same area as the cross section of the wires.

The small equivalent diameter of the wires forming the electrode of the present invention advantageously allows the mass of the latter to be limited, with a view to using it in batteries. Thus, the electrode according to the invention, formed from the electron collector covered with a conversion film, advantageously has a mass per unit area of less than 1000 g/m² of geometric area, preferably of between 10 g/m² and 500 g/m² of geometric area, the geometric area being the area of the metal fabric on the microscopic scale. This geometric area is therefore independent of the thin structure of the textile.

The transition metal or metals of the electron collector are preferably chosen from the group formed by nickel, cobalt, manganese, copper, chromium and iron. Among these metals, iron in particular is preferred.

During the formation of the conversion film forming the active material, these metals are converted by an appropriate treatment, described in more detail below, into a compound of said transition metal or metals. This compound is advantageously chosen from among the chalcogens and the halogens, preferably from among the chalcogens (oxygen, sulfur, selenium and tellurium) and, particularly preferably, the metal compound present in the conversion film is a metal oxide.

In a particularly preferred embodiment of the invention, the metal oxide satisfies the formula:

$$M_xO_y,$$

where $1 \leq x \leq 3$ and $1 \leq y \leq 5$, preferably $1 \leq y \leq 4$, and M is at least one transition metal. This compound is preferably chosen from the group formed by the spinel structures $AB_2O_4$, where A is at least one transition metal chosen from the group formed by Fe, Mn, Cr, Ni, Co and Cu, and B is at least one metal chosen from the group formed by Fe, Cr and Mn, and/or from the group formed by the sesquioxides $M'_2O_3$, where M' is at least one transition metal chosen from the group formed by Fe, Mn, Cr, Ni, Co and Cu.

The transition metal compound is in particular $Cr_2O_3$ or a compound satisfying the formula:

$$Fe_{x'}Cr_{y'}Mn_{z'}O_4,$$

where $0 \leq x' \leq 1$, $0 \leq z' \leq 1$, and $x'+y'+z'=3$.

Preferably, the valence of M is equal to 2 or 3, in particular equal to 3. The compounds of formula $Fe_{x'}Cr_{y'}Mn_{z'}O_4$ include for example the compounds of formula $Fe_{x'}Cr_{1-x'}Cr_2O_4$, where x' has the value indicated above, and the compounds of formula $Fe_{x'}Ni_{1-x'}O_4$, where x' has the value indicated above.

As indicated above, the conversion film of the textile electrode used in the present invention is a nanostructured film containing nanoparticles having an average diameter of between 1 nm and 1000 nm, preferably between 10 nm and 300 nm. Such a nanostructured film is distinguished by a rough and porous structure, and contains at least 50 wt %, preferably at least 70 wt % of nanoparticles.

In the conversion film of the textile electrode, the nanoparticles are preferably regrouped and agglomerated with one another, the agglomerates preferably having an average size of between 1 nm and 10 000 nm, in particular between 10 nm and 3000 nm. The basic porous structure of the nanoparticle agglomerates may be demonstrated for example by scanning electron microscopy.

The conversion film (electrochemically active material) preferably covers the entire surface of the electron collector and preferably has a thickness of between 30 nm and 15 000 nm, in particular between 30 nm and 12 000 nm.

According to one particularly advantageous embodiment, the electron collector is a fabric formed from an alloy based on iron that may be drawn into very thin wires, such as austenitic steels like 316L steel.

Metal fabrics based on transition metals capable of being used, after formation of a nanostructured conversion film as described above, as negative electrode of a battery are known in the art and are commercially available for example under the following names: square-mesh plain weave, square-mesh twill weave, weft-rib plain weave, weft-rib twill weave, warp-rib plain weave and warp-rib twill weave.

The formation of the nanostructured conversion film is described in the application FR 2870639. The treatment used in this document may be applied without further precautions or modifications to the metal textiles described above. Said conversion treatment is for example a high-temperature heat treatment in a reducing, neutral or oxidizing atmosphere. These treatments are known to those skilled in the art and are in use at the present time.

For example, the treatment may be a treatment in hydrogen at a temperature of between 500° C. and 1000° C., preferably between 600° C. and 800° C., for example at a temperature close to 700° C., for a period of time varying from 1 h to 16 h.

It may also be a heat treatment in air at a temperature of between, for example, 600° C. and 1200° C., preferably between 800° C. and 1150° C., for example at a temperature close to 1000° C., for a period of time varying from 1 min to 16 h.

The conversion film resulting from the oxidizing or reducing heat treatment does not generally have the definitive nanostructured structure desired. The final nanostructuring of the electrode, that is to say the nanoparticle formation, only occurs during the first discharge of the battery. It is of course possible to submit the textile electrode to such a discharge before incorporating it into a lithium battery. This first discharge may take place, for example, by reducing the textile electrode relative to a lithium electrode in an organic electrolyte containing lithium salt at a reduced current density (0.05 mA/cm² to 0.5 mA/cm² of electrode geometric area) up to a potential of 20 mV relative to the lithium, and then by oxidizing said textile electrode at a reduced current density (0.05 mA/cm² to 0.5 mA/cm² of electrode geometric area) up to a potential of 3000 mV relative to the lithium.

The negative electrode used in the present invention is coated, over all its surface capable of coming into contact with a liquid electrolyte, with a lithium-ion conductive solid electrolyte. This solid electrolyte must be water- and air-impermeable under the conditions of use of the electrochemical generator. It is deposited directly onto the nanostructured conversion film of the electrode.

In a preferred embodiment of the present invention, the lithium-ion conductive solid electrolyte is a ceramic.

Ceramics capable of forming the lithium-ion conductive, solid electrolyte are known per se. They are sold for example by Ohara under the names LISICON (lithium super ionic conductor) and LIC-GC. They are materials having the following composition:

$Li_{1+x}(M, Al, Ga)_x(Ge_{1-y}Ti_y)_{2-x}(PO_4)_3$ or $Li_{1+x}Al_xTi_{2-x}(PO_4)_3$. These materials are described for example in the article by J. Fu, *Solid State Ionics*, 96, (1997), pages 195-200. A thin film of these materials may be deposited by electrophoresis or by sputtering.

In another embodiment, the lithium-ion conductive, solid electrolyte is formed by a film, microporous or nonporous, of a hydrophobic polymer imbibed, after deposition onto the negative electrode, with a hydrophobic ionic liquid containing a nonhydrolyzable lithium salt.

This microporous film of hydrophobic polymer may be deposited, for example, by dip coating the negative electrode in a solution consisting of acetone, propylene carbonate and PVDF-HFP, followed by a step of evaporating the acetone and then the propylene carbonate at 120° C. in vacuum.

A nonporous film of polymer may be deposited for example via cataphoresis (2 V/cm to 10 V/cm electric field applied for 2 to 300 seconds) of an amine-modified epoxy resin, such as Catolac ED 5000 supplied by PPG, which is then crosslinked (for example 150° C. for 15 minutes).

By way of example of hydrophobic ionic liquids, mention may be made of 1-ethyl-3-methylimidazolium bis(trifluoromethanesulfonyl)imide (EMI TFSI), 1-propyl-3-methylimidazolium bis(trifluoromethanesulfonyl)imide (PMI TFSI), 1-ethyl-3-methylimidazolium bis(pentafluoroethanesulfonyl)imide (EMI BETI) or 1-propyl-3-methylimidazolium bis(pentafluoroethanesulfonyl)imide (PMI BETI), or a mixture of these. The hydrophobic ionic liquid furthermore preferably contains from 0.1 to 1 M of a nonhydrolyzable lithium salt such as lithium bis(trifluoromethanesulfonyl)imide (LiTFSI), lithium bis(pentafluoroethanesulfonyl)imide (LiBETI) or lithium bis(fluorosulfonyl)imide (LiFSI).

The lithium-ion conductive, solid electrolyte film, covering the active material of the negative electrode, preferably has a thickness of between 1 µm and 50 µm, in particular between 1.5 µm and 30 µm and ideally between 2 µm and 10 µm.

When the negative electrode is a textile electrode, it is not always essential that said textile structure of the electrode be still apparent after the deposition of the solid electrolyte. In other words, the latter may partially or even completely fill the openings or apertures in the negative electrode, the half-cell then having the form of a continuous sheet enclosing the textile electrode described.

However, in a particular embodiment of the half-cell of the present invention, the thickness of the lithium-ion conductive solid electrolyte film is sufficiently small that the apertures in the textile structure of the electrode are not closed, in other words the textile structure of the electrode is still visible after deposition of the solid electrolyte and the half-cell has the appearance of a grid, for example a square grid. This apertured structure of the half-cell is of benefit when, in an electrochemical generator containing a stack of a plurality of half-cells, the direction of conduction is perpendicular to the plane of said stacked half-cells.

The solid electrolyte deposited as a thin film on the surface of the nanostructured negative electrode must follow the sometimes substantial volume variations of the latter without cracking. The cracking of the solid electrolyte would lead in fact to rapid degradation of the negative electrode. The ceramic nature of the solid electrolyte may mean that it has insufficient elasticity to withstand the volume variations of the electrode.

To solve this problem and prevent the solid electrolyte from cracking, the latter is deposited onto the nanostructured surface of the negative electrode in a plurality of mutually adjacent regions separated by small voids that will be filled later on with a material that is insoluble in and impermeable to the liquid electrolyte, said material being more deformable, plastically or elastically, than the solid electrolyte. Such a material may be for example a hydrophobic organic polymer, preferably a crosslinked organic polymer. The voids filled with said hydrophobic polymer preferably cover less than 20%, more preferably less than 10%, of the nanostructured surface of the negative electrode.

While the present invention deals with a "continuous film of a solid electrolyte completely covering the surface of the nanostructured active material of the electrode", this also includes this embodiment where, in certain regions of the film, the solid electrolyte is replaced with a hydrophobic polymer capable of absorbing the volume variations of the electrode. This polymer is preferably deposited in gaps that are not covered by the ceramic, by a cataphoresis process. Those skilled in the art will in fact understand that it is essential, for the electrical generator to function correctly, that the aqueous liquid electrolyte does not make contact with the negative electrode and that this contact can be prevented either by a continuous film of a lithium-ion conductive solid electrolyte, or by a continuous film formed by a discontinuous deposition of a lithium-ion conductive, solid electrolyte and of a hydrophobic polymer impermeable to the aqueous electrolyte, this hydrophobic polymer filling the spaces between the lithium-ion conductive, solid electrolyte.

As indicated in the introduction, the present invention furthermore has as its subject an electrochemical generator comprising one or more of the half-cells described above.

Such an electrochemical generator comprises, in addition to one or more half-cells as described above:

an aqueous electrolyte containing LiOH, in which the half-cell is immersed;

an air electrode, in contact with the aqueous electrolyte containing LiOH; and an oxygen-emitting electrode, likewise in contact with the aqueous electrolyte containing LiOH.

The air electrode plays the role of positive electrode during the discharge of the electric generator (reduction of the oxygen in the air into hydroxide ions). Air electrodes are known. Preferably, in the present invention, an air electrode will be used that consists of (i) a carbon powder in which fine particles of a catalyst, for example manganese dioxide, pyrolyzed cobalt porphyrin (CoTMPP), platinum or silver, have been dispersed; (ii) a hydrophobic organic binder, for example polytetrafluoroethylene; and (iii) a microporous separator which has the function of electrically isolating the air electrode from the oxygen-emitting electrode, while allowing penetration of the aqueous electrolyte. By way of an example of such a microporous separator, mention may be made of the commercially available product Celgard®, a microporous material based on polyethylene/polypropylene.

Appropriate air electrodes are sold for example by E-Tek and Electric Fuel Ltd (Arotech Corporation) and described for example in the international patent application WO 2000/036676.

The oxygen-emitting electrode replaces the air electrode during the recharging of the electric generator. It is formed from a metal that is not corroded by the aqueous electrolyte, for example a stainless steel such as 316L steel. A catalyst, for example a metal oxide such as $NiCo_2O_4$, may be deposited on the surface of this electrode, for example by electrophoresis or pyrolysis by sputtering, so as to reduce oxygen-emitting overpotentials.

The aqueous electrolyte, in which the half-cell or half-cells, the air electrode and the oxygen-emitting electrode are immersed, is an aqueous solution of lithium hydroxide (LiOH).

The capacity per unit area of the air electrode of an electrochemical generator according to the invention does not limit the capacity of the generator because the oxygen is not stored in situ but taken from the air.

On the contrary, the negative electrode, even when it is a textile electrode, has a limited capacity per unit area of between 0.5 and 5 $mAh/cm^2$, most often between 1 and 2 $mAh/cm^2$.

So as to increase the capacity of the electrochemical generator as much as possible, it is therefore highly recommended to make use of a plurality of half-cells (each formed from an electrode, preferably a textile electrode, having a nanostructured conversion film and coated with a lithium-ion conductive solid electrolyte). These half-cells are preferably stacked and electrically connected in parallel. The assembly thus obtained is immersed in the aqueous electrolyte formed from an aqueous solution of LiOH. It is possible to add a support salt, for example KOH, so as to ensure that the aqueous electrolyte has a good ionic conductivity at the end of the charging cycle, when the LiOH concentration is at its lowest. When the diffusion direction of the Li$^+$ cations is perpendicular to the plane of the stacked half-cells, it is important that the latter have an apertured structure, that is to say that the solid electrode has been deposited as a sufficiently thin film for the apertured structure of the textile electrode to be preserved. This is necessary to guarantee the free diffusion of the Li$^+$ and OH$^-$ ions and to prevent the formation of a concentration gradient which would cause the internal resistance of the battery to increase.

However, when the diffusion pathway of the lithium ions is parallel to the plane of the stacked half-cells, as in FIG. 1 appended, the hydroxide and lithium ions can migrate freely between these half-cells and the air electrode or the oxygen-emitting electrode through the gaps separating the half-cells.

Figure 2:
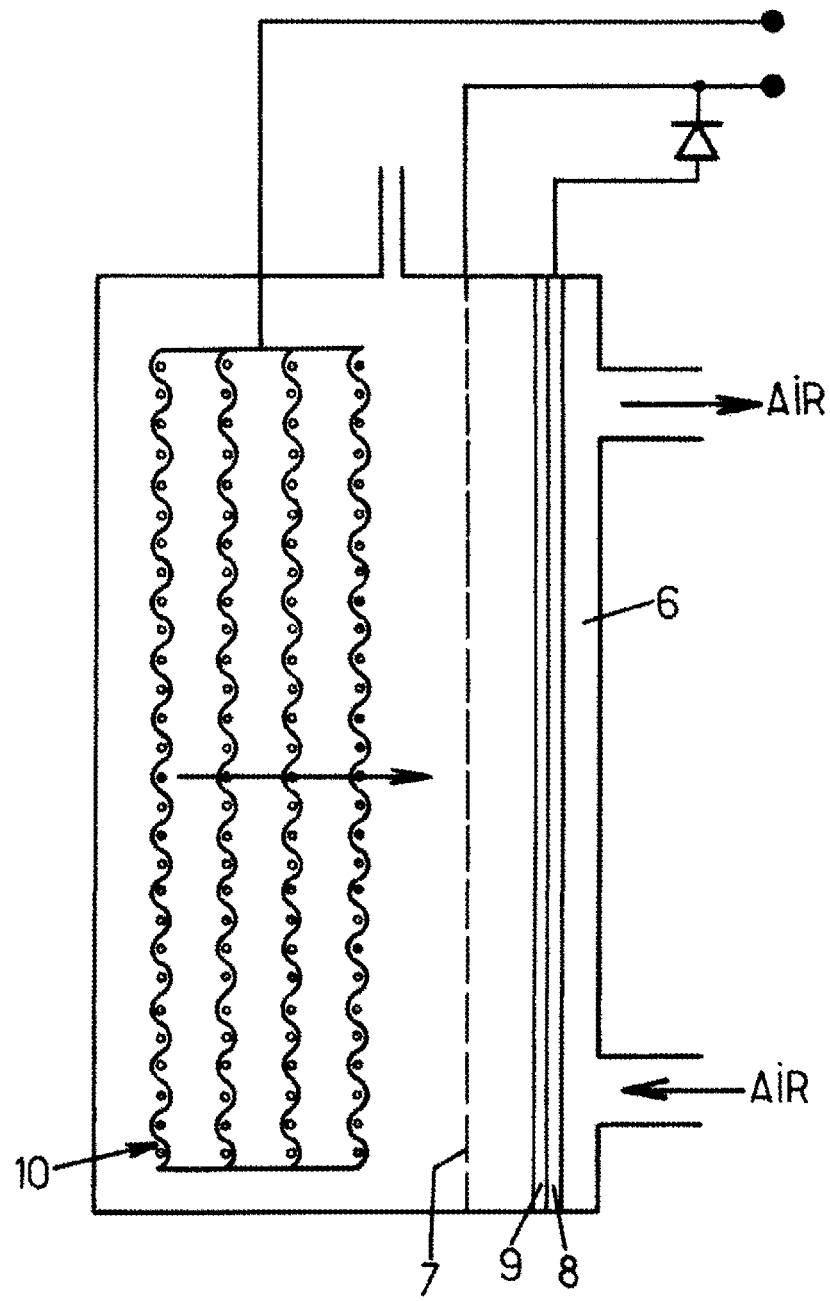

The invention is described in more detail using two embodiments shown in FIGS. 1 and 2, respectively.

FIG. 1 shows an electrochemical generator of the present invention containing four half-cells 1. Each half-cell is formed by a woven textile electrode 10 having warp yarns 2a and weft yarns 2b. Each of the warp and weft yarns consists of a central part corresponding to the electron collector 3 and a peripheral part corresponding to the electrochemically active material 4. The cross section of the textile electrodes passes between two neighboring warp yarns here, and the electron collector 3 is consequently visible only in the weft yarns 2b of the woven structure. Each textile electrode is surrounded by a solid electrolyte 5 that totally encloses the textile electrode so as to isolate it from the aqueous liquid electrolyte 6 in which the four half-cells 1 are immersed. The deposit of solid electrolyte 5 here is such that the half-cell has a filled structure, and not an apertured grid-type structure reflecting the textile structure of the electrode 10 that it encloses.

Also immersed in the aqueous liquid electrolyte 6 (LiOH) are two oxygen-emitting electrodes 7 that, like the nanostructured electrodes 10 (negative electrodes), have a woven textile structure. The oxygen-emitting electrodes 7 are formed from stainless steel but, unlike the negative electrodes, do not comprise a nanostructured conversion film. The electrochemical generator also comprises two air electrodes 8 separated from the aqueous liquid electrolyte 6 by a film 9 which may be a microporous separator or an anionic polymer. In this embodiment, the direction of conduction is generally parallel to the plane of the four stacked half-cells 1 and perpendicular to the plane of the oxygen-emitting electrode 7. The Li$^+$ and OH$^-$ ions may consequently migrate freely in the liquid electrolyte in the spaces between the half-cells 1 and are not troubled by the fact that the latter do not have an apertured grid-type structure. The textile structure of the oxygen-emitting electrode 7 guarantees the free flow of cations and anions between the nanostructured electrodes 10 and the air electrode 8 during the discharge phase.

FIG. 2 shows another embodiment of an electrochemical generator according to the present invention. The main difference between this embodiment and that of FIG. 1 is the relative arrangement of the various electrodes. In this embodiment the four half-cells 1 hare placed parallel to one another. They are also parallel to the oxygen-emitting electrode 7 and the air electrode 8. The direction of diffusion of the Li$^+$ and OH$^-$ ions here is therefore perpendicular to the plane of the half-cells and the latter must have an apertured structure, that is to say the deposit of the solid electrolyte must be sufficiently thin that the openings in the textile structure of the negative electrode 10 are not blocked.

The invention claimed is:

1. A half-cell comprising:
    an electrode formed of a current collector containing one or more transition metals from groups 4 to 12 of the Period Table of the Elements, and of an electrochemically active material present on the surface of the current collector in the form of a nanostructured conversion film containing nanoparticles having an average diameter of between 1 nm and 1000 nm, said electrochemically active material containing at least one compound of the transition metal or the transition metals present in the current collector; and
    a 1 μm to 50 μm thick, water- and air-impermeable lithium-ion conductive, solid electrolyte deposited on the nanostructured conversion film in a plurality of mutually adjacent regions separated by gaps that are not covered by the electrolyte filled with a water- and air-impermeable material that is more deformable, plastically or elastically, than the lithium-ion conductive, solid electrolyte,
    the lithium-ion conductive, solid electrolyte being a ceramic.

2. The half-cell as claimed in claim 1, Wherein the electrode has a textile structure formed from metal wires with a nanostructured surface conversion film, forming the active material of the electrode.

3. The half-cell as claimed in claim 2, wherein the textile structure is a woven structure.

4. The half-cell as claimed in claim 1, wherein the equivalent diameter of the cross section of the metal wires covered with an active material conversion film is between 3 μm and 1 mm.

5. The half-cell as claimed in claim 1, wherein the lithium-ion conductive, electrolyte film has a thickness of between 1.5 μm and 30 μm.

6. The half-cell as claimed in claim 2, wherein the thickness of the lithium-ion conductive solid electrolyte film is sufficiently small that the apertures in the textile structure formed by the electrode are not closed.

7. The half-cell as claimed in claim 1, wherein the current collector contains iron and the surface conversion film forming the active material contains iron oxide.

8. An electrochemical generator containing at least one half-cell as claimed in claim 1.

9. The electrochemical generator as claimed in claim 8, further comprising:
    an aqueous electrolyte containing LiOH;
    an air electrode, in contact with the aqueous electrolyte containing LiOH; and
    an oxygen-evolving electrode, in contact with the aqueous electrolyte containing LiOH.

10. The electrochemical generator as claimed in claim 9, wherein the aqueous electrolyte containing LiOH is an aqueous solution of LiOH.

11. The half-cell of claim 1, wherein the material filling the small voids is a hydrophobic organic polymer.

12. An electrochemical generator containing at least one half-cell comprising
    an electrode formed of a current collector containing one or more transition metals from groups 4 to 12 of the Period Table of the Elements, and of an electrochemically active material present on the surface of the current collector in the form of a nanostructured conversion film containing nanoparticles having an average diameter of between 1 nm and 1000 nm, said electrochemically active material containing at least one compound of the transition metal or the transition metals present in the current collector; and a 1 μm to 50 μm thick, water- and air-impermeable lithium-ion conductive, solid electrolyte deposited on the nanostructured conversion film in a plurality of mutually adjacent regions separated by gaps that are not covered by the electrolyte filled with a water- and air-impermeable material that is more deformable, plastically or elastically, than the lithium-ion conductive, solid electrolyte, the lithium-ion conductive, solid electrolyte being a ceramic;

the electrochemical generator further containing:

an aqueous electrolyte containing LiOH;

an air electrode, in contact with the aqueous electrolyte containing LiOH; and an oxygen-evolving electrode, in contact with the aqueous electrolyte containing LiOH.

13. The electrochemical generator of claim 12, wherein the aqueous electrolyte containing LiOH is an aqueous solution of LiOH.

14. The half-cell as claimed in claim 1, wherein the water- and air-impermeable material that is more deformable, plastically or elastically, than the lithium-ion conductive, solid electrolyte is a hydrophobic polymer.

15. The half-cell as claimed in claim 1, wherein the 1 μm to 50 μm thick, water- and air-impermeable lithium-ion conductive, solid electrolyte deposited onto the nanostructured conversion film in a plurality of mutually adjacent regions separated by the gaps filled with a water- and air-impermeable material that is more deformable, plastically or elastically, than the lithium-ion conductive, solid electrolyte is a continuous film.

16. The half-cell as claimed in claim 1, wherein the water- and air-impermeable lithium-ion conductive, solid electrolyte is deposited directly onto the nanostructured conversion film.

17. The electrochemical generator as claimed in claim 12, wherein the water- and air-impermeable material that is more deformable, plastically or elastically, than the lithium-ion conductive, solid electrolyte is a hydrophobic polymer.

18. The electrochemical generator as claimed in claim 12, wherein the 1 μm to 50 μm thick, water- and air-impermeable lithium-ion conductive, solid electrolyte deposited onto the nanostructured conversion film in a plurality of mutually adjacent regions separated by the gaps filled with a water- and air-impermeable material that is more deformable, plastically or elastically, than the lithium-ion conductive, solid electrolyte is a continuous film.

19. The electrochemical generator as claimed in claim 12, wherein the water- and air-impermeable lithium-ion conductive, solid electrolyte is deposited directly onto the nanostructured conversion film.

* * * * *